Figure 3:
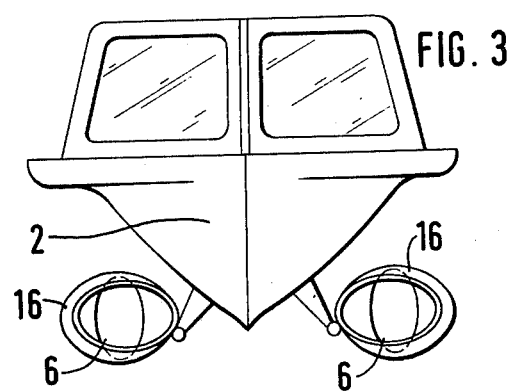

United States Patent [19]

Müller

[11] 4,254,729

[45] Mar. 10, 1981

[54] HULLS FOR SEA VESSELS

[76] Inventor: Eckhardt Müller, Vilbeler Pfad 29, 6368 Bad Vilbel 4, Fed. Rep. of Germany

[21] Appl. No.: 880,334

[22] Filed: Feb. 23, 1978

[30] Foreign Application Priority Data

Feb. 23, 1977 [DE] Fed. Rep. of Germany ....... 2707631

[51] Int. Cl.³ ............................................. B63B 1/28
[52] U.S. Cl. ................................................. 114/280
[58] Field of Search ............... 114/271, 274, 279, 280, 114/282, 283, 284, 61; 115/42, 1 C, 16

[56] References Cited

U.S. PATENT DOCUMENTS

| | | | |
|---|---|---|---|
| 1,256,246 | 2/1918 | Nagel | 115/34 R |
| 2,503,480 | 4/1950 | Gruszecki | 115/4 |
| 2,530,718 | 11/1950 | Napoli | 115/16 |
| 3,013,515 | 12/1961 | Morel | 114/283 |
| 3,213,818 | 10/1965 | Barkley | 115/1 C |
| 3,528,380 | 9/1970 | Yost | 114/283 |
| 3,605,672 | 9/1971 | Strumbos | 115/42 |
| 3,981,259 | 9/1976 | Harper, Jr. | 114/61 |
| 3,991,698 | 11/1976 | Simpson | 114/288 |
| 4,048,939 | 9/1977 | Jones, Jr. | 114/274 |

FOREIGN PATENT DOCUMENTS

| | | | |
|---|---|---|---|
| 32188 | 10/1964 | Fed. Rep. of Germany | 114/274 |
| 26206 | 3/1902 | Switzerland | 115/34 R |

*Primary Examiner*—Trygve M. Blix
*Assistant Examiner*—Jesus D. Sotelo
*Attorney, Agent, or Firm*—Schwartz, Jeffery, Schwaab, Mack, Blumenthal & Koch

[57] ABSTRACT

Disclosed is a hull for a sea vessel having at least one pair of flow tubes mounted to the hull and extending substantially parallel to and symmetrically with the keel line of the hull below the water line. The flow tubes themselves are preferably of an elliptical cross-section having an inlet at the forward section of the hull and an outlet at the aft section of the hull for the flow of sea water therethrough. The flow tubes are movably mounted to enable the raising and lowering corresponding to the velocity of the hull through the water and the water conditions respectively. The sea vessel with the improved hull design is preferably propelled by an airscrew engine or a jet engine.

18 Claims, 19 Drawing Figures

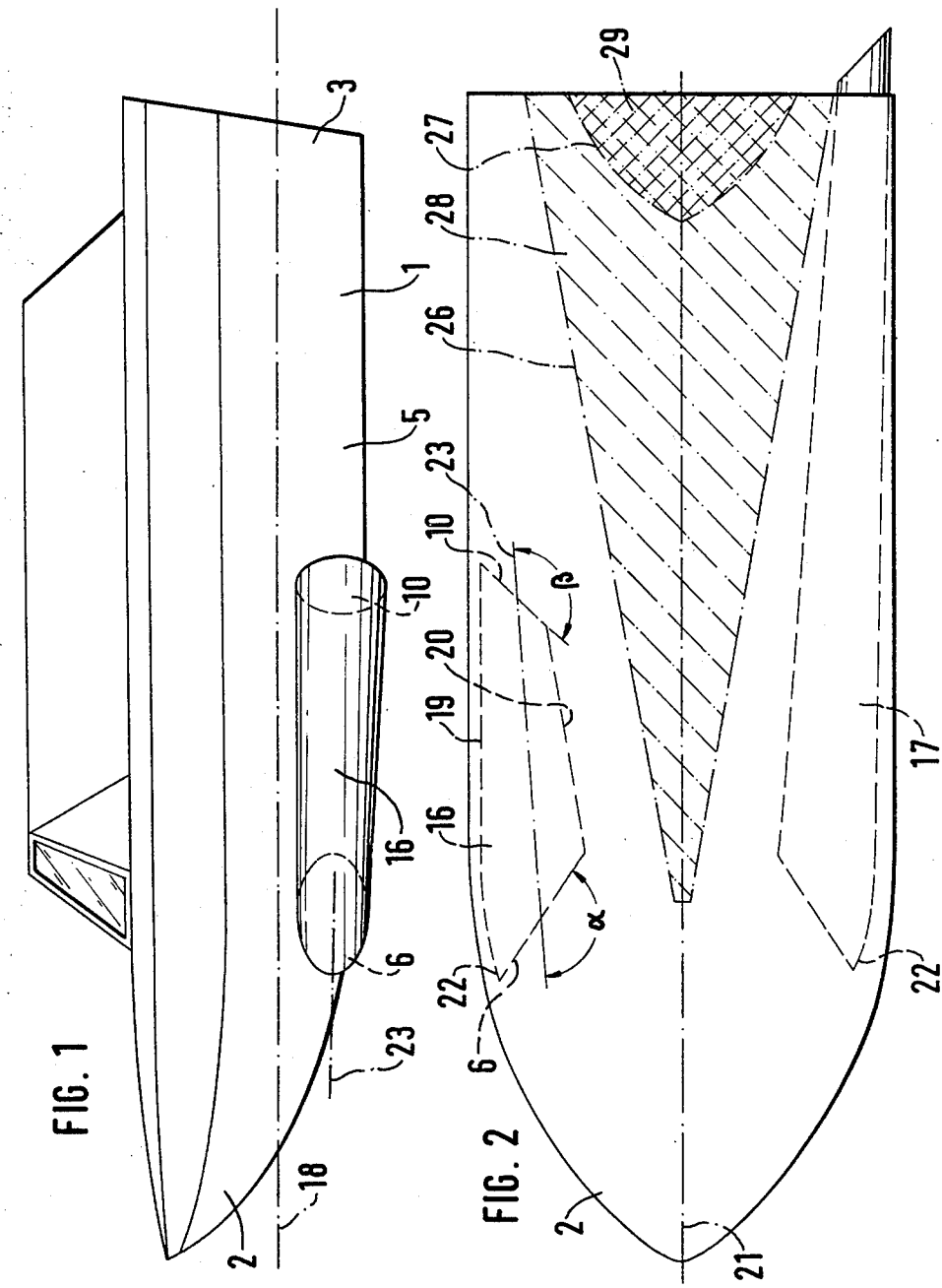

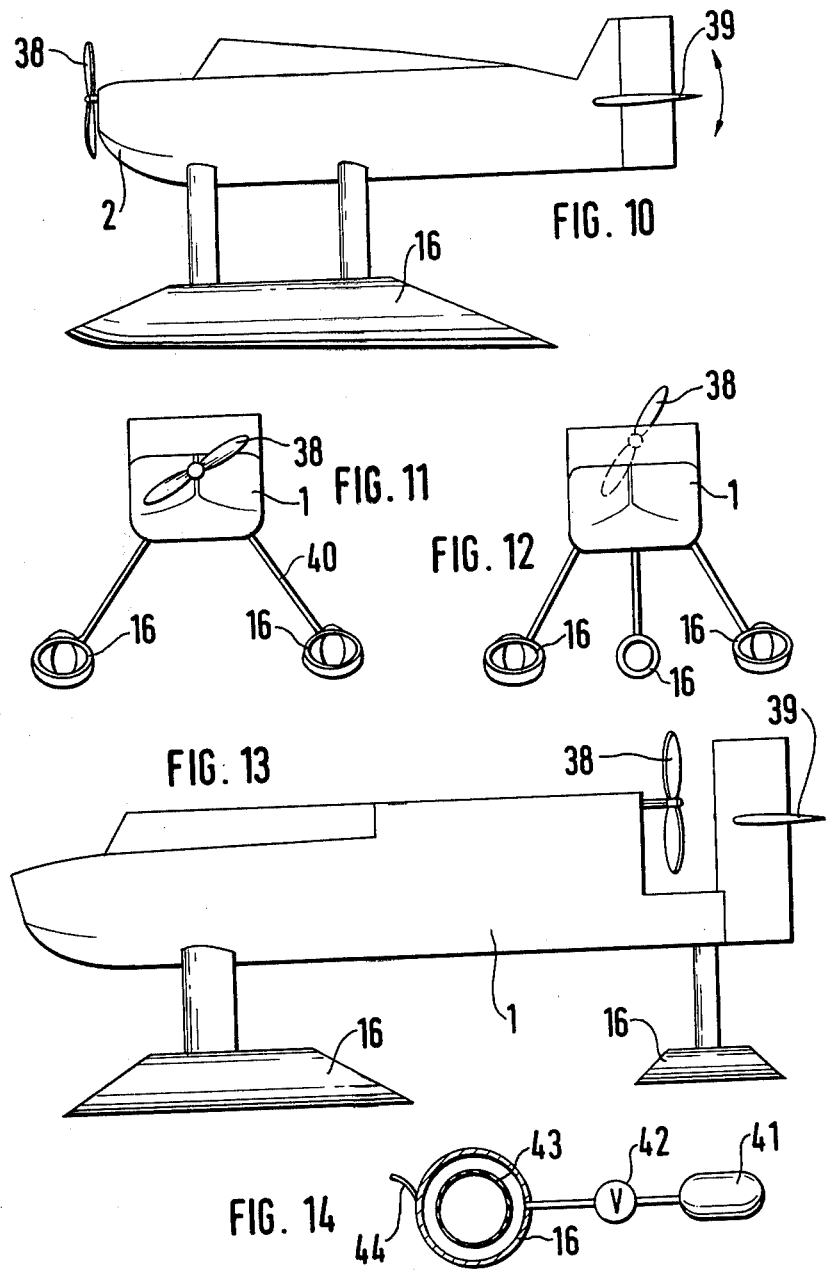

HULLS FOR SEA VESSELS

The invention concerns the hull of a ship with flow tubes located between the bow and the stern.

In the ship's hull of modern planing boats, the bilge is drawn much higher in the forebody and the rib in the bottom of the forebody is mostly convex to the midship frame; this reduces impact forces encountered in a rough sea. The bottom of the aft section of such boats, on the other hand, has only moderate bilging or none at all, in order to achieve high speed with relatively low engine capacities. In order to have the boats run dry and to throw the water spray off downward to the side, the bilge is designed in the shape of a channel pointing diagonally downward. This chambering is a characteristic of all modern planing boat outlines.

There are known further so-called semi-planing ship's hulls, displaying a constant bottom bilging from bow to stern. They possess very great strength of bottom and land relatively softly on the water after having been thrown in the air by rough seas.

Planing boats with strongly bilged bottoms of 20° to 25° from the bow to level represent semi-planing or displacement boats rather than planing. With proper design they can be operated above their critical velocity. Boats of this type are capable of high speeds but are also highly uneconomical because they require engines 35 to 70% more powerful than boats with planing bottoms bilged to a lesser extent to achieve the same speed on smooth water.

It is the object of the invention to provide a means to stabilize a ship's hull, especially during planing motion on agitated water and, to prevent or reduce excessive lifting from the surface of the water by the motion of the waves, so that subsequent hard impacts can be avoided. At the same time, the outline of the hull is to be simplified.

The problems recited above are being solved in part by hydrofoil boats, but these hydrofoils are highly expensive in their design.

Two types of hydrofoils are known in this type of craft, i.e. partially submerged and fully submerged foils. The partially submerged type is mounted on a U- or V-shaped frame fastened to the hull and, on quite water, only a part of the foil is submerged. Because the frames and hydrofoils extend past the width of the hull, they act as stabilizing fins in moderately rough water. For very rough seas, however, long, heavy and expensive struts are required and for this reason semi-submerged hydrofoils are used mainly on quiet inland waters. With fully submerged hydrofoils, the struts stand almost vertically under the hull and the foils remain submerged. In order to maintain a certain depth, the foils must be equipped with ailerons operated by highly sensitive, rapidly reacting automatic steering devices which measure the height of oncoming waves mechanically or electronically and alter the lift of the hydrofoils accordingly. Especially in the case of violent, short seas, it is thus difficult to maintain control of hydrofoil craft at high speeds in spite of this investment.

The problems recited are solved in keeping with the present invention by arranging outside the hull of the ship below its design water line on each side, symmetrically to the keel line, one or more flow tubes and/or flow semi-tubes with their longitudinal axes approximately parallel to the keel line. The cross-section of the flow tubes may be of many arbitrary shapes, but it is preferably elliptical or even round, and it may also be polygonal.

According to a preferred embodiment of the invention, the cross-section of the flow tubes or semi-tubes is shaped elliptically at the inlet and the outlet with the principal axis of the elliptical cross-section of the inlet parallel and the principal axis of the elliptical cross-section of the outlet vertical to the water line. Flow semi-tubes are defined as tubes slit open in their longitudinal direction, while their cross-section may be arbitrary. The term further includes tubes in a semi-circular or a C-shape.

In the case of the ship's hull of the present invention, the displaced water is taken up largely by the flow tubes, leading to a reduction in the resistance of the hull.

Another advantage of the invention consists of the fact that the hull of the ship is stabilized in accordance with the invention, especially during planing motion, because the water in the flow tubes counteracts abrupt beating and impacting motions of the ship's hull diagonally and vertically to the direction of the ship's motion by the inertia of its mass. This substantially improves the comfort of the passengers, as the disadvantage of rapidly travelling ships (which bounce over waves and are thus subjected to hard impact) is greatly reduced or even eliminated.

The number of flow tubes arranged on each long side of the ship's hull is governed by the width of the body of the ship and the tube configuration at the inlet portion thereof the wedge combination with shape of the foresection of the ship permits the tubes to pivot from a vertical to a horizontal position.

According to one particular embodiment of the invention, the cross-sectional area of the flow tubes decreases in the direction from the bow to the stern. This increases the flow velocity in the tube and leads to a further reduction in hull resistance.

The inlet and outlet of the flow tubes is cut advantageously diagonally with the cutting angle of the inlet opposing the cutting angle of the outlet in its direction. The tubes are arranged advantageously so that the longer surfaces are outside and the shorter surfaces close to the keel. Because of such shapes, the tubes fit well against the keel of the ship.

The inlet of the flow tubes is approximately within the area of the beginning curvature of the bow keel line and the outlet advantageously in the rear half of the ship's hull.

According to another embodiment of the invention, several flow tubes of the same or of different types are arranged behind each other. The tubes arranged following each other may be located in a single line or they may be arranged in laterally offset positions, depending on the size of the hull of the ship.

According to a preferred embodiment of the invention, the flow tubes are arranged movably relative to the ship's hull by mechanical or hydraulic means. In one form of this embodiment, the flow tubes are designed adjustable in height relative to the ship's hull. The flow tubes preferably display a two-point support along the axis of the tube, said support being differentially adjustable in height.

In a modification of this arrangement of the invention, only the support at the rear end of the tube is adjustable in height, while the front support possesses a swivel bearing. As an example of the height adjustment means, a telescope device may be employed which, depending on the size of the ship, can be activated purely mechanically or hydraulically by means of electrically powered pumps or pistons.

According to another advantageous embodiment of the invention, the flow tubes are supported rotatably around their longitudinal axes, with their axis of rotation located upon the short part of the circumference of the tube resulting from the diagonal cut or outside this part. If is of further advantage to support the flow tubes on springs.

Because of the arrangement of the flow tubes in keeping with the invention, externally to the ship's side, the bow can be kept very small, resulting in a small bow wave and thus reduced resistance.

Finally, for the same reason, the keel can be designed flat, imparting good planing properties to the hull of the ship. The simplification of the hull leads to cost savings, especially if the hull is made of steel, because in the case of a complicated hull design, more partial cuts and thus an increased number of welds are required.

In one form of the embodiment of the invention, the holding and spring installation of the flow tubes has a rocker arm supported rotatably at two points approximately in the line of flow. The rocker arm is designed as a torsion-free, hollow shape, in which the springs, in the form of rubber, air or steel, are supported against the hull of the ship. In this arrangement of the invention, it is not necessary to conduct sliding elements through the wall of the hull. To perform the rotating motion of the flow tube, at least one piston rod, hinged to the flow tube and operable hydraulically, pneumatically or with a spindle motor, is arranged in the rocker arm, the piston rod extending from the shape being clad to conform to the flow.

In a further development of the invention, running wheels or crawling tracks are set in the upper tube wall in the retracted condition, and they point downward following a rotation of the flow tubes by 180°. The running wheels or crawling tracks may further be equipped with their own drive means. This drive is intended preferably for short overland trips, if, for example, no slip facilities are available.

In another development of the invention, a part or all of the internal surface of the flow tubes are covered with an inflatable liner so that the flow tubes are partially or fully closed in the inflated state of the liner, thus possessing increased buoyancy. The liner is preferably a rubbery material and is inflatable by compressed air.

If the ship is powered with an airscrew or jet drive according to known methods, the flow tube can be provided through the arrangement described in the foregoing with variable buoyancy so that the hull of the ship is maintained above the surface of the water even during periods of slow movement. It is then sufficient to design the ship's hull essentially only for the maximum air resistance encountered, while the lower part of the ship's hull must be designed to provide mechanical strength against water spray only.

Figure 5A:
Figure 5B:
Figure 5C:
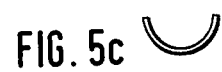
Figure 4:
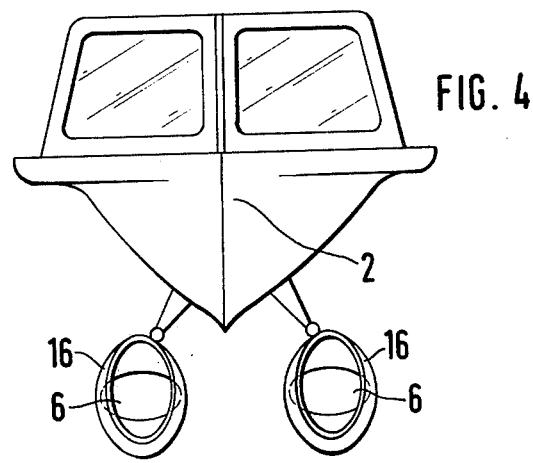
Figure 6:
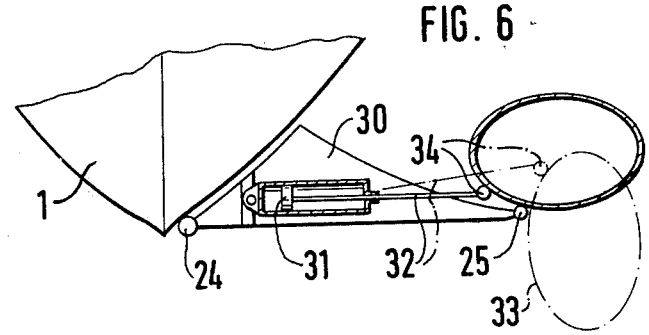
Figure 7:
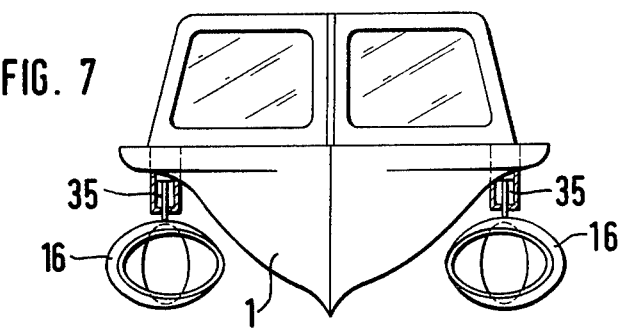
Figure 8:
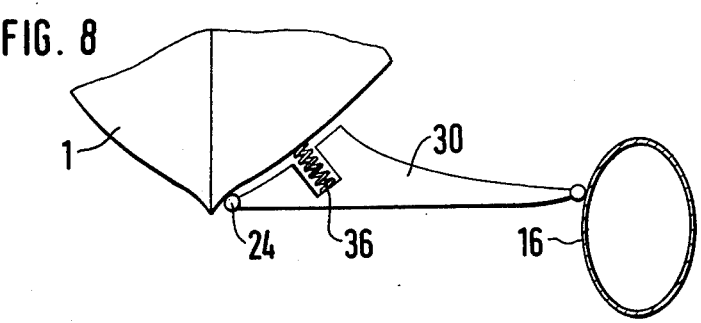
Figure 9:
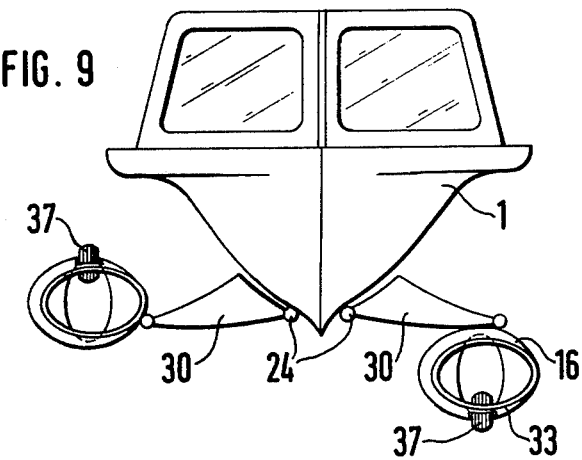
Figure 15:
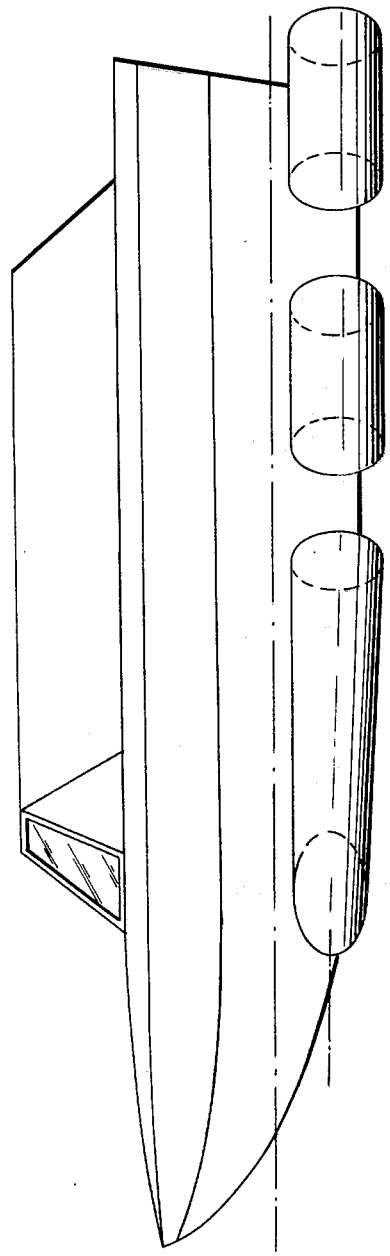
Figure 16:
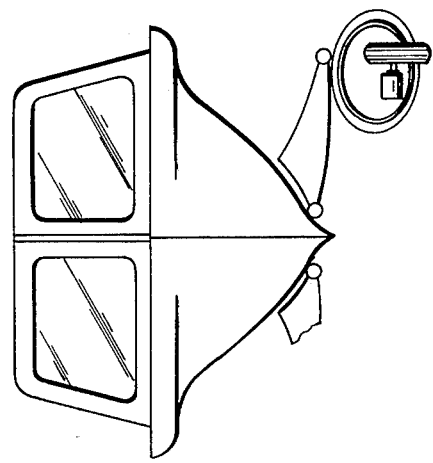

During the testing of the invention with a floating ship's hull, energy savings of approximately 20 to 25% were determined, depending on speed and external design. The invention is explained with the aid of several embodiments represented in the drawings. The drawings show the following:

FIG. 1—a side view of a ship's hull;

FIG. 2—a top view of a ship's hull where the starboard side is equipped with a short flow tube and the portside with a continuous flow tube, as another embodiment;

FIG. 3—a front view of the ship's hull;

FIG. 4—a front view of a ship's hull with the flow tubes in another position;

FIG. 5a—c—different configuration of the cross-sections of the flow tubes;

FIG. 6—an enlarged representation of an embodiment of a device for imparting rotating motion of the flow tubes;

FIG. 7—a front view of a ship's hull with a device for the adjustment of the height of the flow tubes;

FIG. 8—an enlarged representation of an embodiment of a spring installation;

FIG. 9—a front view of a ship's hull, where the flow tubes are equipped with casters;

FIG. 10—a ship's hull with flow tubes and airscrew drive;

FIG. 11—a front view of FIG. 10;

FIG. 12—a frong view of a ship's hull with airscrew drive aft;

FIG. 13—the side view of the form of embodiment of FIG. 12;

FIG. 14—a flow tube in cross-section with an inflatable inner liner;

FIG. 15—side view of a ship's hull with several pairs of flow tubes mounted one after the other along the keel line;

FIG. 16—a front view of a ship's hull equipped with self-driving wheels; and

Figure 17:
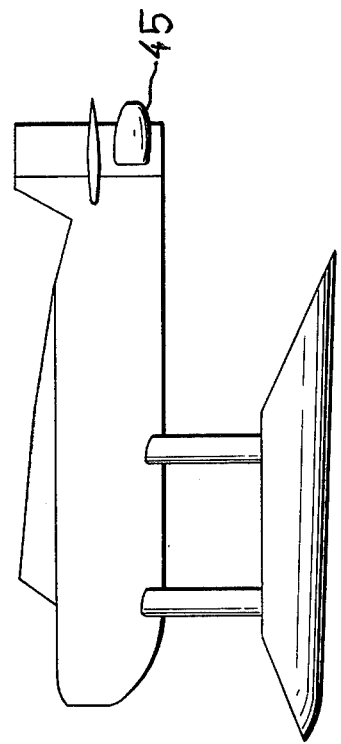

FIG. 17—a ship's hull with flow tubes and a jet engine 45 as a propelling means.

In the individual figures, identical or similar elements are indicated by the same reference symbols.

In the case of the ship's hull 1 shown in FIG. 1, a flow tube 16 is shown, extending outside the side 5 facing the observer, said flow tube having an inlet 6 and an outlet 10.

Based on the arrangement taken in accordance with the invention, the design of the bow of the hull can be significantly simplified because the impact on the bow is substantially reduced.

FIG. 2 displays a top view of a ship's hull with two examples of embodiments of the invention. At the starboard side of the ship's hull, a short flow tube 16 is illustrated. On the portside, a flow tube 17 extending slightly past the stern 3 is illustrated. Obviously, the starboard and portsides are equipped with symmetrical flow tubes in the actual design. Both of the flow tubes 16 and 17 in FIG. 2 are in their upper rotational position, wherein the diagonal cut $\alpha$ of the inlet 6 of flow tube 16 and the diagonal cut $\beta$ of the outlet 10 are clearly visible. The angles $\alpha$ and $\beta$ may be opposite and equal or they may be opposite and unequal. These diagonal cuts result in the fact that the wall surface 19 of the tubes 16 is longer than the shorter circumferential side 20 of the flow tube 16, which is facing the keel 21. The inlets of the flow tubes 16 and 17 are slightly raised, as indicated by the reference symbol 22. With increasing speeds of the planing motion, the bow 2 is raised from the water level and in this phase the flow tubes are rotated so that said tubes in their extended position occupy positions in which the longer surfaces 19 are directed toward the surface of the water. As a result, the longer external surfaces 19 act as planing skids. Additionally, it is of advantage, especially during the planing motion, to incline the line of the center axis 23 of the tubes 16 and 17 slightly with respect to the design water line.

FIG. 2 further shows the bilge lines 26 and 27 which circumscribe the load-carrying surfaces 28 and 29. The ship's hull is supported by these surfaces due to the elevation of the bow. With increasing speeds of planing travel, progressively smaller areas are employed in the carrying function.

FIGS. 3 and 4 display a front view of the ship, with FIG. 3 showing the raised position of the flow tubes 16, while FIG. 4 indicates the rotated extended position of the flow tubes 16. FIGS. 3 and 4 clearly show the elliptical shape of the tubes 16 with the principal axis of the elliptical cross-section of the inlet 6 being parallel to the water line, and the principal axis of the elliptical cross-section of the outlet 16 being perpendicular to the water line. During the rotating process (from the position in FIG. 3 to the position in FIG. 4), the axes of the ellipses are also rotated so that in the extended rotational position, the principal axis of the elliptical cross-section of the inlet 6 is perpendicular to the water line and the principal axis of the elliptical cross-section of the outlet 16 is parallel to the water line. In this position demonstrating the effect of the flow tubes in their capacity as skids, the planing surface area increases from front to rear so that in the locations where the skids are needed, planing surfaces with increasing areas are available. Because of the slight elevation of the forward part 22 shown in FIG. 2 at the longer circumferential side 19 of the flow tubes 16 or 17, the surfaces slide over relatively small waves, while the impact generated in this manner is absorbed by an absorption means described hereinafter.

With an increase in the height of the waves, an increasing amount of the water passes through the inlet 6 and thus through the tubes, so that the effective mass of the ship's hull increases for a short period of time. The mass acts against the upward directed impact of the wave with its higher mass inertia leading to substantial damping of the up and down motion of the bow 2.

FIGS. 5a 5b and 5c shows several different forms of the cross-sectional shapes of the flow tubes. Thus, FIG. 5a displays a shape of a cross-section with a longitudinal slit. Structural material can be saved in this manner to reduce the mass. However, water spray can escape in this case so that the closed form of the tube is preferable. FIG. 5b shows a C-shaped cross-sectional form slit in the longitudinal direction. This embodiment enables an increase in the planing surface. Additional savings of structural material can be achieved with the embodiment shown in FIG. 5c with its semi-circular cross-section.

FIG. 6 displays a rocker arm 30, attached at point 24 in a hinged manner relative to the ship's hull. The rocker armm 30 contains a piston 31, which can be activated pneumatically or hydraulically. The piston acts upon a piston rod 32, which is connected again through a hinge with the wall 33 of the flow tube at 34. The rocker arm 30 is also connected through a hinge with the wall 33 of the flow tube at 25, so that the distance between points 25 and 34 provides an adequate lever force to perform the rotating movement. The rocker arm 30 and the piston rod 32 extending from the rocker arm are clad to conform to the flow pattern.

FIG. 7 shows a ship's hull from the front with a simplified representation of a device to adjust the height of the flow tubes 16. This device may consist, for example, of a telescope suspension 35, which can be activated pneumatically or hydraulically. The devices for the height adjustment and to perform the rotating motion can be operated uniformly or independently from each other.

FIG. 8 shows an arrangement similar to the representation of FIG. 6, wherein a rocker arm 30 is connected rigidly or in the fashion shown in FIG. 6 with the flow tube 16. In the rocker arm 30, a spring 36 is arranged so that it is supported against the hull 1 of the ship. In this manner, a springing rotation can be performed around the hinged point 24.

In FIG. 9, a representation similar to FIG. 7, rocker armms 30 are displayed, which are connected through hinges with the ship's hull 1 at 24, in an embodiment corresponding to that of FIG. 6 and/or FIG. 8, and having mounted in the jacket 33 of the flow tube 16 a caster 37 located such that it is in an upper position when the flow tube is in the retracted position. A 180° rotation of the flow tube placed the caster in its lower position, so that the ship's hull 1 is capable of locomotion on land.

FIG. 10 shows a ship's hull 1 with an airscrew 38 arranged in front of the bow 2 and an elevator assembly 39. The flow tubes 16 can be designed adjustably in height with respect to the hull. In order to vary the buoyancy, the flow tubes 16 are provided in their internal surface with a rubber liner inflatable with compressed air. This embodiment of the invention is schematically represented in FIG. 14. FIG. 11 shows a front view of the embodiment according to FIG. 10 demonstrating the inclined position on the supports 40. Because the vessel is operated practically only in a planing mode and the surface of the water is rarely smooth, it is necessary to provide spring support for the flow tubes 16 and to make them adjustable in height at least in the direction of the flow so that the angle of attack can be varied during the planing motion. Depending on the intended design, it may be sufficient to set the angle of attack of the flow tubes 16 through the elevator assembly 39.

In FIGS. 12 and 13, a ship's hull 1 with an airscrew 38 is represented with the airscrew located aft. In this embodiment, it is advantageous to provide a third flow tube 16 so that a three-point support is utilized during the planing motion.

FIG. 14 shows a flow tube 16 in a schematic representation with an inner liner 40 which can be inflated by compressed air from a compressed air bottle 41 by way of a control valve 42, to the extent that the inner space of the tube is closed off. As a result of the diagonal cut of the flow tube 16, the oncoming water is deflected during planing motion. With the aid of the inflatable internal linear buoyancy of the flow tube 16 can be varied over a wide range. It is possible in accordance with an embodiment of the invention to design the ship's hull 1 so that it will not come into contact directly with the water, even if displacement motion would be required otherwise. For this reason the entire ship's hull can be designed for air resistance only with the exception of a slight reinforcement of the bottom part of the hull for protection against spraying water during high speed planing travel. To reduce the amount of water spray, deflectors can be provided on the outer water of the flow tubes also.

In all of the examples of embodiment, the flow tubes 16 exhibit their outstanding effect during planing motion, and the crests of the waves are cut beginning at a certain steepness in front of the tube inlet, so that the cut part of the wave flows through the flow tube 16, thus increasing the mass inertia of said flow tube at the moment when the wave causes the ship's hull to move upwards. This results in a damping of the up and down motion of the ship's hull by two factors; first by the cutting of the oncoming wave and second, by mass inertia being increased at the most favorable moment by the incoming water. This leads to an overall quieter planing travel with lesser amplitudes, saving substantial amounts of driving energy. On the other hand, the speed of the planing motion can be increased with the same motive power capacity.

I claim:

1. In a hull for a sea vessel having a bow, a stern, a design water line and a keel line, the improvement comprising a pair of flow tubes mounted to the hull and extending substantially parallel to the keel line, and symmetrically to the keel line below the design water line, each of said flow tubes having an inlet tube and an outlet tube of elliptical cross-section with the principal axis of the elliptical cross-section of the inlet tube parallel to the water line and the principal axis of the elliptical cross-section of the outlet tube vertical to the water line.

2. The hull of claim 1 wherein the cross-sectional area of the flow tube diminishes in the direction from bow to stern.

3. The hull of claim 1 wherein the plane of each tube inlet is opposite the plane of each tube outlet.

4. The hull of claim 1 wherein the inlet of each flow tube is arranged in the area of the bow curvature of the keel line and the outlet of each of the flow tubes is arranged at the rear half of the hull.

5. The hull of claim 1 wherein several pairs of flow tubes are mounted one after the other along the keel line.

6. The hull of claim 1 further comprising a means for adjustment of the distance between the flow tubes and the outside of the hull.

7. The hull of claim 6 wherein the means comprises a two-point support along the longitudinal axis of each flow tube, the support closest to the bow area of the hull being a swivel bearing.

8. The hull of claim 6 wherein the means comprises independent and separately movable supports located along the longitudinal axis of each flow tube.

9. The hull of claims 7 or 8 wherein the flow tubes are rotatably mounted about said supports.

10. The hull of claim 1 further comprising a spring mount of the flow tubes to the hull.

11. The hull of claim 1 further comprising a rocker arm member attached to the hull and supporting the flow tubes, said rocker arm being a torsion-free, hollow-shaped, arm containing a spring means biased against the hull.

12. The hull according to claim 11 further comprising a piston arranged within the rocker arm acting on a piston rod extending from the rocker arm in the direction of the flow tube whereby extension of the piston rod causes the rotating motion of the flow tube about its longitudinal axis.

13. The hull according to claim 1 further comprising wheels or tracks mounted in the flow tubes for transportation of the improved hull on land.

14. The hull of claim 13 wherein the wheels or tracks are equipped with a drive.

15. The hull of claim 1 further comprising an inflatable liner disposed within the flow tubes.

16. The hull of claim 1 further comprising a means for propelling the hull.

17. The hull of claim 16 wherein the propelling means is an engine selected from the group consisting of airscrew engines and jet engines.

18. The hull according to claim 1 having an aerodynamic configuration.

* * * * *